United States Patent
Kim et al.

(10) Patent No.: US 8,453,156 B2
(45) Date of Patent: May 28, 2013

(54) METHOD AND SYSTEM TO PERFORM LOAD BALANCING OF A TASK-BASED MULTI-THREADED APPLICATION

(75) Inventors: Wooyoung Kim, Champaign, IL (US); Michael Joseph Voss, Mahomet, IL (US)

(73) Assignee: Intel Corporation, Santa Clara, CA (US)

( * ) Notice: Subject to any disclaimer, the term of this patent is extended or adjusted under 35 U.S.C. 154(b) by 1094 days.

(21) Appl. No.: 12/414,322

(22) Filed: Mar. 30, 2009

(65) Prior Publication Data

US 2010/0251257 A1  Sep. 30, 2010

(51) Int. Cl.
*G06F 9/40* (2006.01)

(52) U.S. Cl.
USPC .......................... 718/105; 717/160

(58) Field of Classification Search
None
See application file for complete search history.

(56) References Cited

U.S. PATENT DOCUMENTS

| | | | | |
|---|---|---|---|---|
| 6,128,720 | A * | 10/2000 | Pechanek et al. | 712/20 |
| 7,962,906 | B2 * | 6/2011 | O'Brien et al. | 717/160 |
| 8,006,238 | B2 * | 8/2011 | Eichenberger et al. | 717/150 |
| 8,104,030 | B2 * | 1/2012 | Silvera et al. | 717/160 |
| 2005/0246705 | A1 * | 11/2005 | Etelson et al. | 718/100 |
| 2008/0141012 | A1 * | 6/2008 | Yehia et al. | 712/226 |

OTHER PUBLICATIONS

Berger, Marsha J. etal., A Partitioning Strategy for Nonuniform Problems on Multiprocessors, 1987 , IEEE, IEEE transactions on computers, vol. C-36, No. 5, pp. 570-580.*
Yang, Chao-Tung etal., A Parallel Loop Self-Scheduling on Extremely Heterogeneous PC Clusters, 2003, Springer-Verlag, 10 pages.*
Intel Threading Building Blocks, 2006-2008, 72 pages, Revision: 1.11, http://www.intel.com.
Robert D. Blumofe, Christopher F. Joerg, Bradley C. Kuszmaul, Charles E. Leiserson, Keith H. Randall, Yuli Zhou, Click: An Efficient Multithreaded Runtime System, 11 pages, MIT Laboratory for Computer Science, Cambridge, MA.
OpenMP Application Program Interface, May 2008, 326 pages, Version 3.0, OpenMP Architecture Review Board.
Niklas Gustafsson, A Deep Dive Into the Concurrency Runtime, 10 pages, Microsoft PowerPoint Presentation.

* cited by examiner

*Primary Examiner* — Eric Coleman
(74) *Attorney, Agent, or Firm* — Schwabe, Williamson & Wyatt, P.C.

(57) ABSTRACT

A method and system to balance the load of a task-based multi-threaded application on a platform. When the work required by the multi-threaded application is represented as a task with a computational requirement that is proportional to the amount of the work, embodiments of the invention control the recursive binary task division of the task using auxiliary partitions to create subtasks of balanced loads to enhance resource utilization and to improve application performance. The task is binary partitioned recursively into a plurality of subtasks until the plurality of subtasks is equal to the plurality of resources available on the platform to execute the subtasks.

22 Claims, 7 Drawing Sheets

```
class split    {
       float my_ratio;
public:
       split(float ratio=0.5f) : my_ratio(ratio) {}
       float ratio () const { return my_ratio; }
};

class partition {
       int parent_load_factor;
       int load_factor;
       int split_load_factor( partition& p )
       {
              size_t lf = p.load_factor;
              p.parent_load_factor = lf;
              if( lf>1 ) {
                     size_t new_lf = lf/2u;
                     p.load_factor = lf-new_lf;
                     return new_lf;
              } else {
                     return lf;
              }
       }
public:
       partition() :   parent_load_factor( number-of-worker-threads ),
                      load_factor( parent_load_factor ) {}
       partition( partition& p) : parent_load_factor( p.load_factor ),
                      load_factor( split_load_factor(p) ) {}
       float load_ratio() {
              return(
                     load_factor==parent_load_factor ?
                     0.5f :
                     (load_factor/float(parent_load_factor))
              );
       }
};
```

700                FIG. 7A

```
template<typename Value>
class blocked_range {
public:
        blocked_range( Value begin_, Value end_, size_t grainsize_=1 ) :
                my_end(end_), my_begin(begin_), my_grainsize(grainsize_)    {}
        blocked_range( blocked_range& r, split s ) :
                my_end(r.my_end),
                my_begin(do_split(r, s.ratio())),
                my_grainsize(r.my_grainsize) {}
        size_t size() const {return size_t(my_end-my_begin);}
private:
        Value my_end;
        Value my_begin;
        size_ty my_grainsize;
        static Value do_split( blocked_range& r, float fr ) {
                Value split_pt = r.my_begin + size_t(r.size()*fr);
                r.my_end = split_pt;
                return split_pt;
        }
};

template<typename Body>
class task_for : public task {
        const Body my_body;
        partition my_partition;
        blocked_range<int> my_range;
        task_for( const blocked_range<int>& range, const Body& body) :
        my_range(range),
                my_body(body),
                my_partition(partition())
        {
        }
        task_for( start_for& parent, split ) :
                my_body(parent.my_body),
                my_partition(parent.my_partition,split()),
                my_range(parent.my_range,split(parent.my_partition.load_ratio()))
        {
        }
        void execute() {
                if( !my_range.is_division_profitable() ) {
                        body(range);
                } else {
                        task_for& b = *new task_for (*this, split());
                        spawn b;
                        spawn this;
                }
        }
};
```

FIG. 7B

METHOD AND SYSTEM TO PERFORM LOAD BALANCING OF A TASK-BASED MULTI-THREADED APPLICATION

FIELD OF THE INVENTION

This invention relates to load balancing, and more specifically but not exclusively, to load balancing of a task-based multi-threaded application on a platform.

BACKGROUND DESCRIPTION

In a task-based multi-threaded application, the work required by the application can be represented as a task with a computational requirement. By using multiple threads to execute the work required by the application, the execution time can be shortened. Task-based multi-threaded applications rely on dynamic work stealing to maximize resource utilization and minimize execution time. Unfinished subtasks pending to be completed by a thread can be stolen by other available threads for execution.

The parallel_for, parallel_reduce and parallel_scan algorithms in Intel® Threading Building Blocks, for example, represent work of a multi-threaded application as a task with a computational requirement, and use recursive binary task division to dynamically create sub-tasks. When a thread picks up a task for execution, it examines the computational requirement of the task. If the thread determines that splitting the task is profitable or worthwhile, it divides the task into two subtasks.

FIG. 1 illustrates a prior art example of the recursive binary task division of a task. The binary task tree 100 shows the final result of the recursive binary task division of an original task 110. In the example of FIG. 1, five threads are assumed to be available for processing the original task 110 and the original task 110 is assumed to have a computational requirement of [0,100). For example, the original task 110 may be a task to iterate over a function one hundred times and thus the computational requirement of the original task 110 is set to a range from 0 (inclusive) to 100 (exclusive).

One thread out of the five available threads picks up the original task 110 for execution. Since there are four other available threads, it is worthwhile to split the original task 110 into subtasks for the four other available threads to steal for execution. The thread working on the original task 110 splits the original task 110 into a left subtask 120 and a right subtask 122 of an equal computational requirement. The left subtask 120 and the right subtask 122 have a computational requirement of [0, 50) and [50,100) respectively.

The recursive binary task division continues to split each subtask into two subtasks having equal computational requirements until the number of final subtasks is equal to the number of available threads. Each available thread is able to execute a respective one of the five subtasks 132, 134, 136, 140, and 142. However, even though the computational requirement of the original task 110 is divisible by 5 equal portions, the binary task tree 100 does not yield subtasks of equal computational requirements.

To mitigate the load imbalance of final subtasks, additional splitting and work stealing occurs to evenly spread the initial unbalanced load distribution. Each work stealing event however, incurs overhead.

BRIEF DESCRIPTION OF THE DRAWINGS

The features and advantages of embodiments of the invention will become apparent from the following detailed description of the subject matter in which:

FIGS. 7A and 7B illustrate code snippets in C++ to implement the recursive binary task division in one embodiment of the invention.

DETAILED DESCRIPTION

References in the specification to "one embodiment" or "an embodiment" of the invention mean that a particular feature, structure, or characteristic described in connection with the embodiment is included in at least one embodiment of the invention. Thus, the appearances of the phrase "in one embodiment" in various places throughout the specification do not necessarily all refer to the same embodiment.

Embodiments of the invention provide a method and system to balance the load of a task-based multi-threaded application on a platform. When the work required by the multi-threaded application is represented as a task with a computational requirement that is proportional to the amount of the work, embodiments of the invention control recursive binary task division of the task using auxiliary partitions to create subtasks of balanced loads to enhance resource utilization and to improve application performance. The task is binary partitioned recursively into a plurality of subtasks until the plurality of subtasks is equal to the plurality of resources available on the platform to execute the subtasks. The resources available on the platform include, but are not limited to, threads, processors, cores of one or more processors, processes of the platform, or any other computing resources located internal or external to the platform to execute the subtasks on the platform.

The platform has a plurality of digital logic modules that include, but are not limited to, central processing units (CPUs), multiple core CPUs, and other functional modules that are able to execute a task(s) of an application. The platform includes, but is not limited to, a desktop computer, a laptop computer, a notebook computer, a netbook, a personal digital assistant (PDA), a server, a workstation, a cellular telephone, a mobile computing device, an Internet appliance or any other type of computing device.

The computational requirement of a task of a multi-threaded application is an indication or a measure of the work required to be performed. In one embodiment, the computational requirement of a task represents the number of iterations of a loop body performing a function. For example, if the task of the multi-threaded application has a loop with a control variable that iterates from a to (b−1), the computational requirement of the task can be set as a range represented by a half-open interval of the form [a, b). The integers a and (b−1)

represent the starting and ending values of the loop control variable. In another embodiment, the computational requirement of a task is determined based on the computational time required for the task. In yet another embodiment, the computational requirement of a task is determined based on the resources available or needed for the task.

Figure 1:
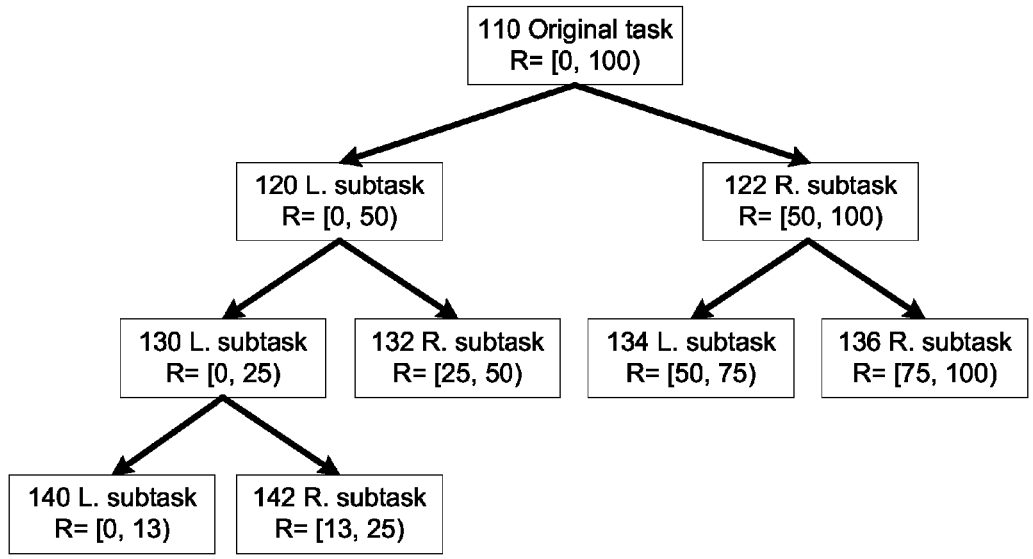
FIG. 1 illustrates a prior art example of a recursive binary task division of a task.
Figure 2:
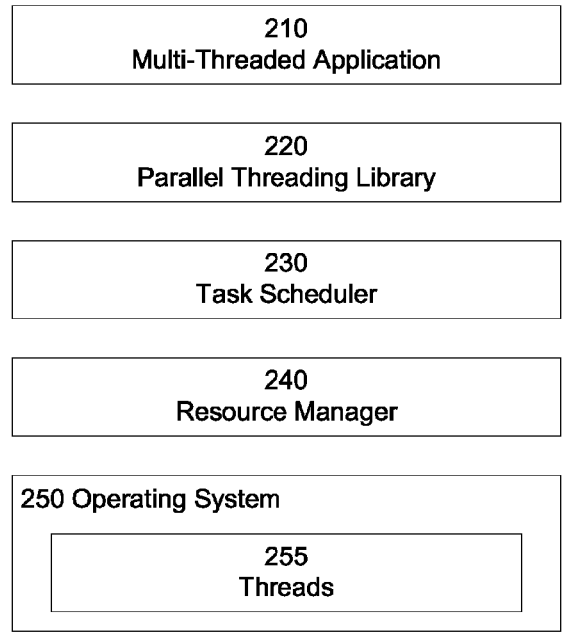
FIG. 2 illustrates the modules of a platform in accordance with one embodiment of the invention.

FIG. 2 illustrates the modules of a platform 200 in accordance with one embodiment of the invention. The platform 200 has a plurality of processors and/or a multi-core processor(s) and the operating system (OS) 250 executes on at least one of the plurality of processors or on one of the cores of multi-core processor(s). The OS 250 has a pool of native threads 255 available to execute tasks on the platform 200.

The resource manager 240 manages the pool of native threads 255 and controls the availability of the threads for execution. The task scheduler 230 schedules tasks to be executed by available threads from the pool of native threads 255. The parallel threading library 220 contains functions that can be referenced or used by a multi-threaded application 210 for parallel execution using the native threads 255. In one embodiment of the invention, the parallel threading library is Intel® Threading Building Blocks. The parallel threading library ensures that the load of the multi-threaded application 210 is balanced by creating subtasks of substantially equal loads using recursive binary task division with the aid of auxiliary partitions in one embodiment of the invention.

Although the modules of the platform 200 are depicted as separate blocks, the operations of one module may be performed by another module. For example, in one embodiment, the OS 250 can perform the functions of the resource manager 240. In another embodiment, the parallel threading library 220 may also be integrated with the OS 250. One of ordinary skill in the relevant art will readily appreciate different combinations of the modules or functions can be performed without affecting the workings of the invention.

In one embodiment of the invention, when a task with a computational requirement is received or created, an auxiliary partition is also created and associated with the task. The auxiliary partition is a pair of numbers, namely, parent load factor and load factor, and is represented in the form <parent load factor, load factor>. The auxiliary partition associated with the original task is set as <p, p>, where p represents the number of resources available on the platform 200 to execute the task. In one embodiment of the invention, the resource manager 240 determines the number of threads available to execute the task. In another embodiment, the number of threads can be less than or equal to the number of processors in the platform 200. In other embodiments, the number of threads corresponds to the number of cores in the multi-core processor(s) of the platform 200.

When a task is divided into a left and a right subtask during the recursive binary task division, the auxiliary partition <m, n> associated with the task is also divided into a left auxiliary and a right auxiliary partition associated with the left and the right subtask respectively. Any task from which a left and a right subtask are derived is termed as the parent task of the left and the right subtask. In one embodiment of the invention, if the load factor n of the auxiliary partition associated with a particular task is equal to 1 (n=1), the particular task is not subdivided into subtasks. If the load factor n of the auxiliary partition associated with a parent task is not equal to 1 (n≠1), the left subtask is associated with a left auxiliary partition of <n, ceiling(0.5*n)>, i.e., the parent load factor of the left auxiliary partition is set as the load factor of the auxiliary partition associated with the parent task and the load factor of the left auxiliary partition is set as the smallest integer not lesser than the result of multiplying the load factor of the auxiliary partition associated with the parent task by 0.5.

Similarly, if the load factor n of the auxiliary partition associated with a parent task is not equal to 1 (n≠1), the right subtask is associated with a right auxiliary partition of <n, floor(0.5*n)>, i.e., the parent load factor of the right auxiliary partition is set as the load factor of the auxiliary partition associated with the parent task and the load factor of the right auxiliary partition is set as the largest integer not greater than the result of multiplying the load factor of the auxiliary partition associated with the parent task by 0.5. In another embodiment of the invention, the assignment of the left and the right partitions can be interchanged without affecting the workings of the invention.

When the left and the right auxiliary partitions are determined, the computational requirement of the parent task can be divided between the left and the right subtasks based on a left partitioning ratio l and a right partitioning ratio r of the computational requirement of the parent task respectively in one embodiment of the invention. The left partitioning ratio l of the left subtask is the ratio of the load factor of the left auxiliary partition to the parent load factor of the left auxiliary partition. Similarly, the right partitioning ratio r of the right subtask is the ratio of the load factor of the right auxiliary partition to the parent load factor of the right auxiliary partition. Both the left partitioning ratio l and the right partitioning ratio r are between 0 and 1 and the resulting computational requirement of each of the left and the right subtasks may be different.

In one embodiment of the invention, if the computational requirement of a parent task is [a, b), the left subtask and right subtask is assigned a computational requirement of [a, a+l(b−a)) and [a+(1−r)(b−a), b) respectively when the parent task is divided. In the event that the result of l(b−a) or (1−r)(b−a) does not yield an integer value, the result is rounded up or rounded down to the nearest integer. The rounding of l(b−a) and (1−r)(b−a) must be consistent, for example, if l(b−a) is rounded up, then (1−r)(b−a) must also be rounded up.

Figure 3:
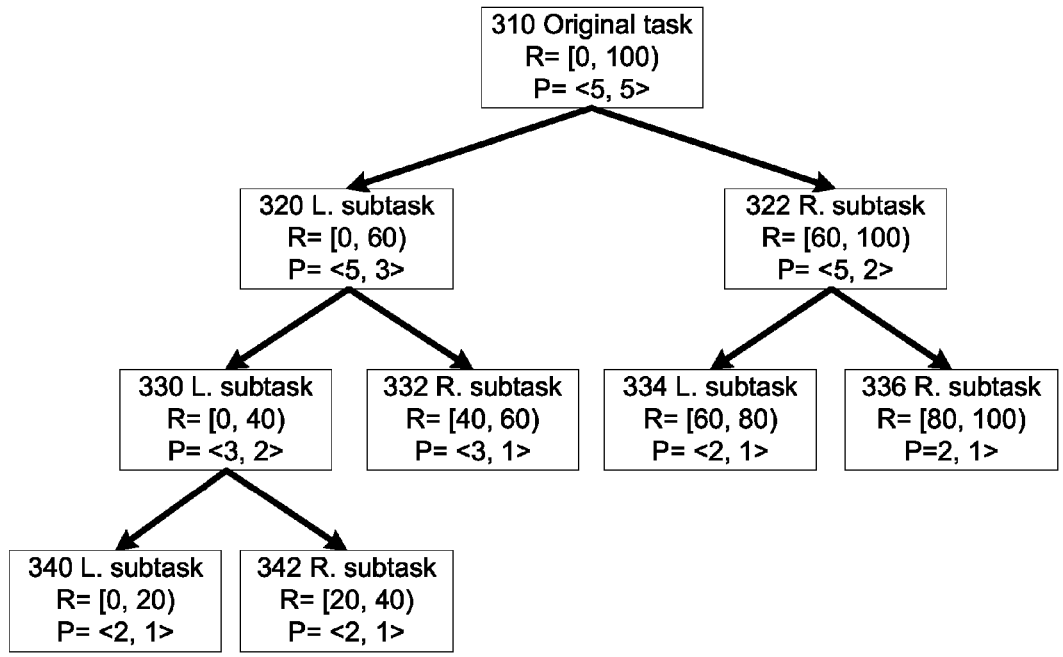
FIG. 3 illustrates a recursive binary task division of a task in accordance with one embodiment of the invention.

FIG. 3 illustrates a recursive binary task division of a task in accordance with one embodiment of the invention. The binary task tree 300 shows the final result of the recursive binary task division of an original task 310 from the multi-threaded application 210 using one or more embodiments of the invention. In one embodiment of the invention, the recursive binary task division of the original task 310 is performed eagerly, i.e., the original task 310 is subdivided into binary task tree 300 before any execution of the subtasks. In another embodiment of the invention, the recursive binary task division of the original task 310 is performed lazily, i.e., the original task 310 is dynamically subdivided into binary task tree 300 when one or more resources are available to execute one or more of the subtasks. For example, one available resource may subdivide original task 310 into a left subtask 320 and a right subtask 322. The resource works on the left subtask 320 and another available resource can pick up the right subtask 322 to perform the subdivision of the right subtask 322.

For the purposes of illustration, the creation of the binary task tree 300 is described herein as an eager performance of the recursive binary task division of the original task 310. One of ordinary skill in the relevant art will readily appreciate the creation of the binary task tree 300 as a lazy performance of the recursive binary task division of the original task 310 and it shall not be described herein. In the example of FIG. 3, five threads are determined to be available for processing the original task 310 and the original task 310 is assumed to have a computational requirement of [0,100). For example, the original task 310 may be a task to execute a function one hundred times and thus the computational requirement of the original task 310 is set to a range from 0 (inclusive) to 100 (exclusive).

One thread out of the five available threads picks up the original task 310 for execution. The thread working on the original task 310 determines if it is worthwhile to divide the original task 310 into subtasks. In one embodiment of the invention, the thread working on the original task 310 relies on the availability of threads to determine if it is worthwhile to perform subdivision of the original task 310. As there are four other available threads, it is worthwhile to divide the original task 310 into a left subtask 320 and a right subtask 322 for the four other available threads to steal for execution. The thread working on the original task 310 splits the auxiliary partition associated with the original task 310 into a left and a right auxiliary partition. As the load factor n of the auxiliary partition associated with the original task 310 is not equal to 1, the parent load factor of the left auxiliary partition associated with the left subtask 320 is set as the load factor of the auxiliary partition associated with the original task 310, and therefore is set to 5. The load factor of the left auxiliary partition associated with the left subtask 320 is set as the smallest integer not lesser than the result of multiplying the load factor of the auxiliary partition associated with the original task 310 by 0.5, and therefore is set to 3 [ceiling(0.5*5) =ceiling(2.5)=3]. As such, the left subtask 320 is assigned a left partition of <5, 3>.

Similarly, the parent load factor of the right auxiliary partition associated with the right subtask 322 is set as the load factor of the auxiliary partition associated with the original task 310, and therefore is set to 5. The load factor of the auxiliary partition associated with the right subtask 322 is set as the largest integer not greater than the result of multiplying the load factor of the auxiliary partition associated with the original task 310 by 0.5, and therefore is set to 2 [floor(0.5*5) =floor(2.5)=2]. As such, the right subtask 322 is assigned a partition of <5, 2>.

The left subtask 320 is assigned a portion of the computational requirement of the original task 310 based on a left partitioning ratio l of the computational requirement. The left partitioning ratio l is determined from the left auxiliary partition associated with the left subtask 320 and is set as the ratio of the load factor of the left auxiliary partition to the parent load factor of the left auxiliary partition and therefore is set as 3/5. Using the formula [a, a+l(b−a)) as described earlier, the computational requirement of the left subtask 320 is set as [0, 60).

Similarly, the right subtask 322 is assigned a portion of the computational requirement of the original task 310 based on a right partitioning ratio r of the computational requirement. The right partitioning ratio r is determined from the right auxiliary partition associated with the right subtask 322 and is set as the ratio of the load factor of the right auxiliary partition to the parent load factor of the right auxiliary partition and therefore is set as 2/5. Using the formula [a+(1−r)(b−a), b) as described earlier, the computational requirement of the right subtask 322 is set as [60, 100).

The recursive binary task division of the original task 310 using the auxiliary partitions continues until the number of subtasks is equal to the number of threads determined to be available. The division of tasks and auxiliary partitions can be done eagerly or lazily as the threads steal tasks. Therefore, the recursive binary task division of the original task 310 stops when five subtasks 332, 334, 336, 340 and 342 are created. The five available threads are able to execute a respective one of the subtasks 332, 334, 336, 340 and 342.

The method and procedure to obtain the auxiliary partition and computational requirement of each of the subtasks 330, 332, 334, 336, 340, and 342 are similar to the method and procedure described earlier for subtasks 320 and 322. One of ordinary skill in the relevant art will readily appreciate how to determine the auxiliary partition and computational requirement of each of the subtasks 330, 332, 334, 336, 340, and 342. Therefore, the method and procedure to determine the auxiliary partition and computational requirement of each of the subtasks 330, 332, 334, 336, 340, and 342 are not described herein.

The binary task tree 300 has 5 subtasks 332, 334, 336, 340, and 342 that each have an equal portion of the computational requirement of the original task 310. Unlike the prior art recursive binary tree 100 that yielded subtasks of unequal computational requirements, embodiments of the invention allow load distribution of the computational requirement of the original task 310 to be balanced among the subtasks 332, 334, 336, 340, and 342 and it reduces the need for work stealing to balance the load. This, in turn, decreases the overheads of work stealing and improves the performance of the execution of the original task 310.

Even though the recursive binary task division is shown as completed when the number of subtasks is equal to the number of available threads, it is not meant to be limiting. In other embodiments, the subtasks may also be further subdivided. For example, a scheduling method may decide to divide a particular set of final tasks to mitigate load imbalance resulting from other factors such as resource availability through work stealing.

The computational requirement of the original task 310 has been described as a one dimensional computational requirement but the embodiments of the invention can also be applied to higher dimensional computational requirements of the original task 310. For example, the following pseudo code can be represented as a task with a two dimensional computational requirement.

```
for (i=0; i<=300; i++) {
    for (j=0; j<100; j++){
        do_test_function (j);
    }
}
```

One of ordinary skill in the relevant art will readily appreciate how to extend the workings of the embodiments of the invention to a task with a higher dimensional computational requirement.

In scenarios where the computational requirement of the original task 310 is not exactly divisible by the number of available threads, the portion of computational requirement of each subtask will be substantially or approximately equal. For example, if six threads are available to execute the original task 310, the recursive binary task division of the original task 310 can yield six subtasks having the following computational requirements: [0, 16), [16, 33), [33, 50), [50, 66), [66, 83), and [83, 100). The computational requirements of the six subtasks are either 16 or 17, depending on the portion of the computational requirement being rounded up or rounded down.

Figure 4A:
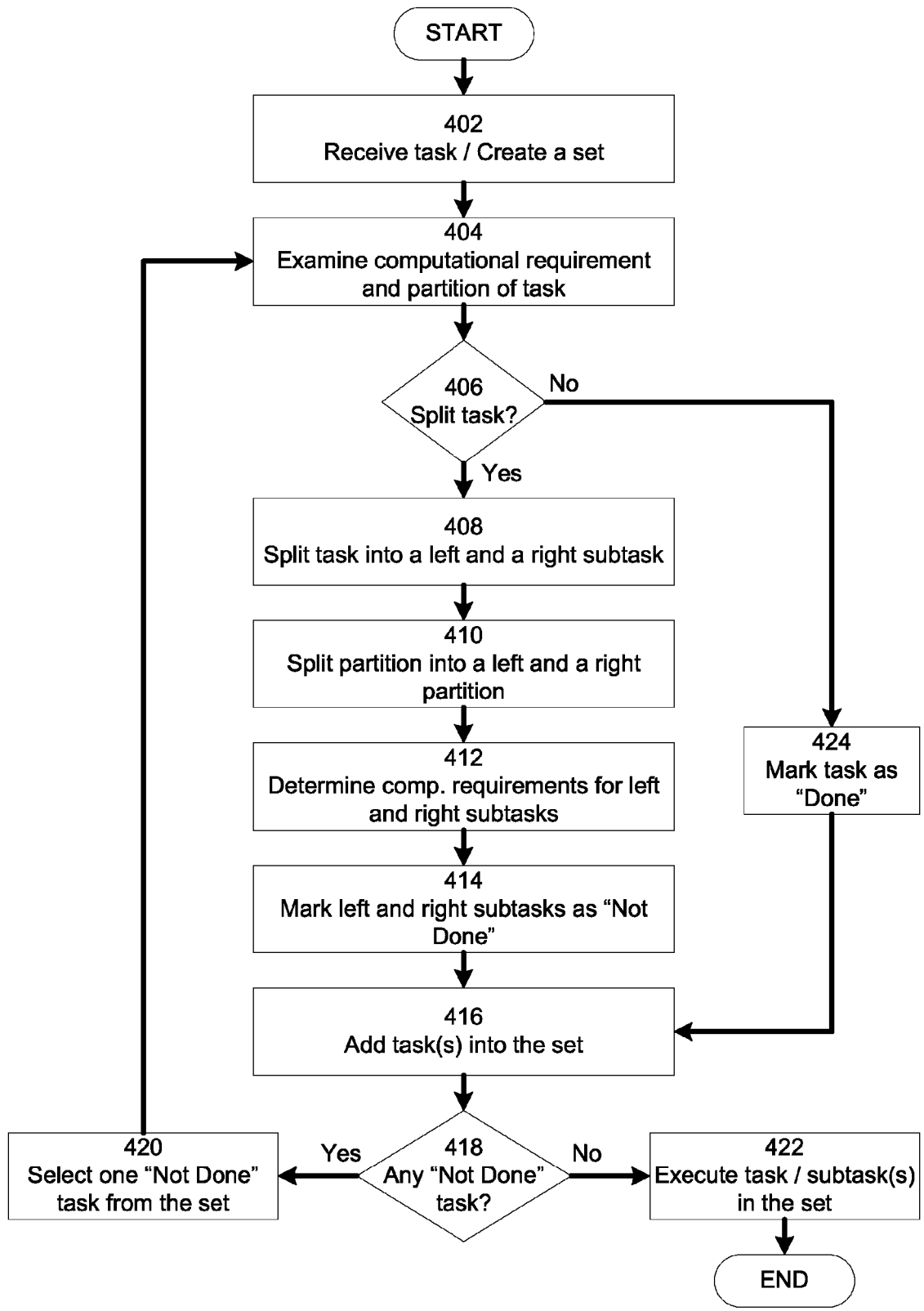
FIG. 4A illustrates a flow chart of the recursive binary task division in accordance with one embodiment of the invention.

FIG. 4A illustrates a flow chart 400 of the recursive binary task division in accordance with one embodiment of the invention. The flow chart 400 illustrates an eager performance of the recursive binary task division of a task. In step 402, the parallel threading library 220 receives a task having a computational requirement from the multi-threaded application 210. The resource manager 240 determines the number of threads available to execute the task. In one embodiment of the invention, the resource manager 240 determines if the number of threads is equal to a number that is a power of two.

In step 402, the parallel threading library 220 creates an auxiliary partition <p, p> associated with the received task based on the number of resources available to execute the task. In addition, the parallel threading library 220 creates a set in step 402 if the set does not exist in one embodiment of the invention.

The parallel threading library 220 examines the computational requirement and the auxiliary partition of the received task in step 404. In step 406, the parallel threading library 220 determines if it is desirable to split the received task. The desirability of splitting the received task depends on factors including, but are not limited to, the overheads required to split the received task, the potential decrease in execution time if the received task is executed by two threads, the interdependence of the functions in the received task, the number of threads available to execute the received task, and other factors that may reduce the execution time of the received task.

If it is not desirable to split the received task, the parallel threading library 220 marks the received task as done in step 424 and adds the received task to the set in step 416. If it is desirable to split the received task, the parallel threading library 220 divides the received task to create a left and a right subtask in step 408. In step 410, the parallel threading library 220 splits the auxiliary partition associated with the received task into a left and a right auxiliary partition. The left and right auxiliary partitions are associated with the left and right subtask respectively. In step 412, the parallel threading library 220 determines the computational requirement of the left and the right subtask based on the left partitioning ratio and the right partitioning ratio of the computational requirement of the received task respectively.

In step 414, the parallel threading library 220 marks the left and right subtasks as "Not Done". The left and right subtasks are added to the set in step 416. In step 418, the parallel threading library 220 checks if there are any "Not Done" tasks in the set. If yes, the parallel threading library 220 selects one of the "Not Done" tasks in step 420 and the flow goes back to step 404. If no, the available threads execute the task or subtask(s) in the set in step 422 as the recursive binary task division is completed.

Figure 4B:
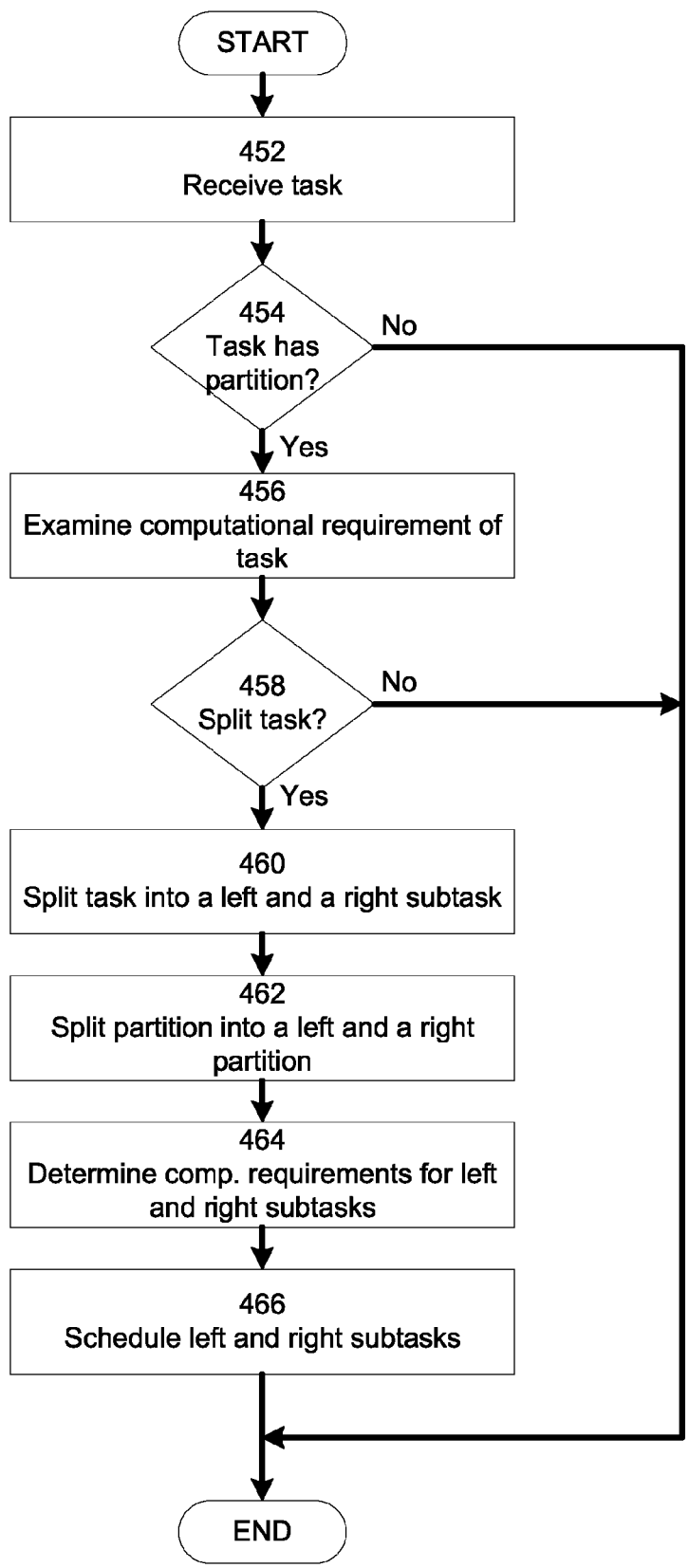
FIG. 4B illustrates a flow chart of the recursive binary task division in accordance with one embodiment of the invention.

FIG. 4B illustrates a flow chart 450 of the recursive binary task division in accordance with one embodiment of the invention. The flow chart 450 illustrates a lazy performance of the recursive binary task division of a task. In step 452, the parallel threading library 220 receives a task or subtask from a queue. In step 454, the parallel threading library 220 checks if the received task has an auxiliary partition. If no, the flow ends. If yes, the parallel threading library 220 examines the computational requirement of the received task in step 456. In step 458, the parallel threading library 220 determines if it is desirable to split the received task.

If it is not desirable to split the received task, the parallel threading library does not perform any binary task division and the flow ends. If it is desirable to split the received task, the parallel threading library 220 splits the received task to create a left and a right subtask in step 460. In step 462, the parallel threading library 220 splits the auxiliary partition associated with the received task into a left and a right auxiliary partition. The left and right auxiliary partitions are associated with the left and right subtask respectively.

In step 464, the parallel threading library 220 determines the computational requirements of the left and the right subtasks based on the left partitioning ratio and the right partitioning ratio of the computational requirement of the received task respectively. The left and the right subtasks are scheduled for execution in the queue in step 466. The parallel threading library 220 performs the steps in flow chart 450 when a resource becomes available to work on a task or subtask that has not been worked on. One of ordinary skill in the relevant art can readily appreciate that the lazy task division can be embedded into any task scheduling methods with work stealing.

Figure 5:
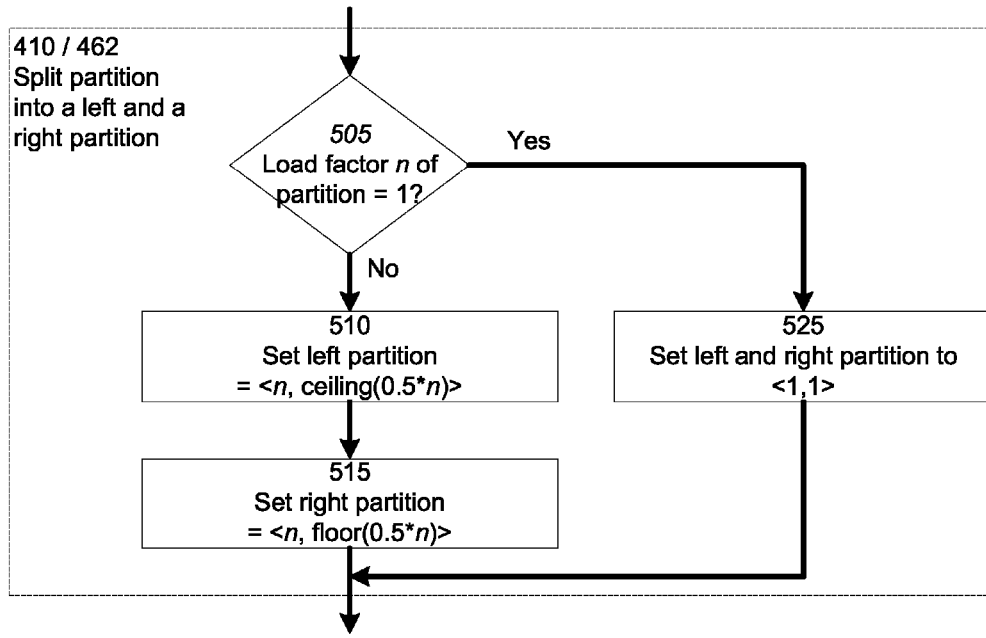
FIG. 5 illustrates a flow chart of the steps to split the partition of a received task into a left and a right partition in accordance with one embodiment of the invention.

FIG. 5 illustrates a flow chart 500 of the steps to split the auxiliary partition of a received task into a left and a right auxiliary partition in accordance with one embodiment of the invention. In step 505, the flow checks if the parent load factor n of the auxiliary partition of the received task is equal to 1. If yes, the left and the right auxiliary partitions are both set to <1, 1> in step 525. If no, the left auxiliary partition is set to <n, ceiling(0.5*n)> in step 510. In step 515, the right auxiliary partition is set to <n, floor(0.5*n)>. In other embodiments of the invention, the assignment of the left and right auxiliary partitions can be interchanged, i.e., the left auxiliary partition is set as <n, floor(0.5*n)> and the right auxiliary partition is set as <n, ceiling(0.5*n)>.

Figure 6:
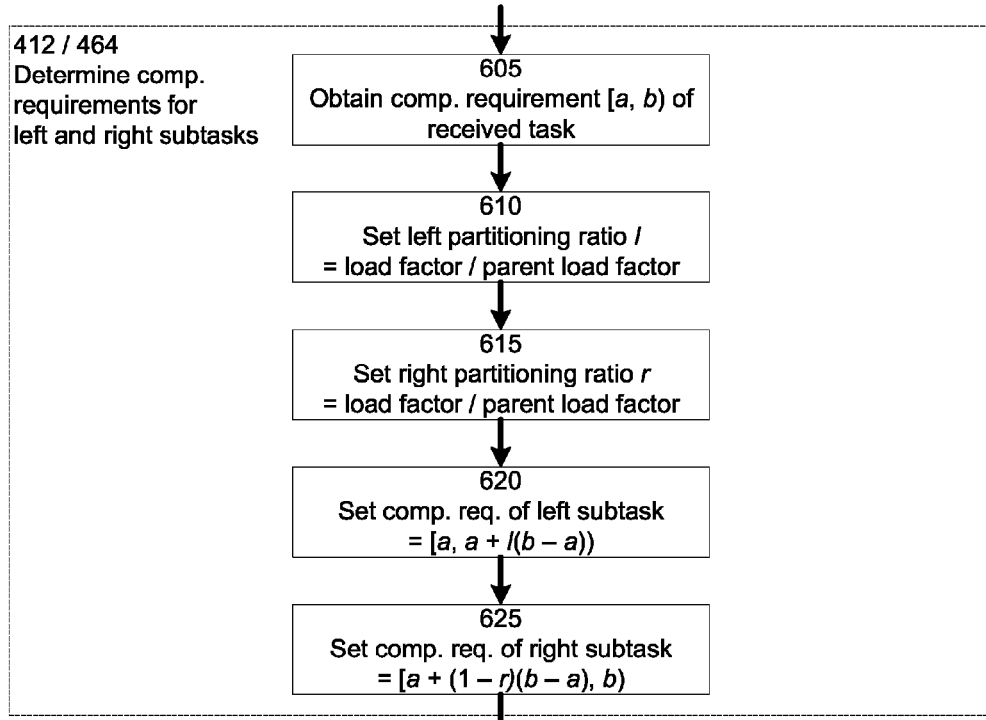
FIG. 6 illustrates a flow chart of the steps to determine the computational requirements for the left and the right subtasks in accordance with one embodiment of the invention.

FIG. 6 illustrates a flow chart 600 of the steps to determine the computational requirements for the left and the right subtasks in accordance with one embodiment of the invention. In step 605, the parallel threading library 220 obtains the computational requirement [a, b) of the received task. In step 610, the parallel threading library 220 sets the left partitioning ratio l associated with the left subtask as the ratio of the load factor of the left auxiliary partition to the parent load factor of the left auxiliary partition. Similarly, the parallel threading library 220 sets the right partitioning ratio r associated with the right subtask as the ratio of the load factor of the right auxiliary partition to the parent load factor of the right auxiliary partition in step 615. In step 620, the parallel threading library 220 sets the computational requirement of the left subtask as [a, a+l(b−a)). Similarly, the parallel threading library 220 sets the computational requirement of the right subtask as [a+(1−r)(b−a), b) in step 625.

By using auxiliary partitions to guide the recursive binary task division of a given task, the load of a task-based multi-threaded application can be balanced even though the computational requirement of the given task is not exactly divisible by the number of available threads in one embodiment of the invention.

FIGS. 7A and 7B illustrate code snippets in C++ to implement the recursive binary task division in one embodiment of the invention. One of ordinary skill in the relevant art will readily appreciate the workings of the code 700 and 750 and the code 700 and 750 shall not be described herein. Functions may be added to the code 700 and 750 and variations of the functions described in the code 700 and 750 are possible without affecting the workings of the invention.

Figure 8:
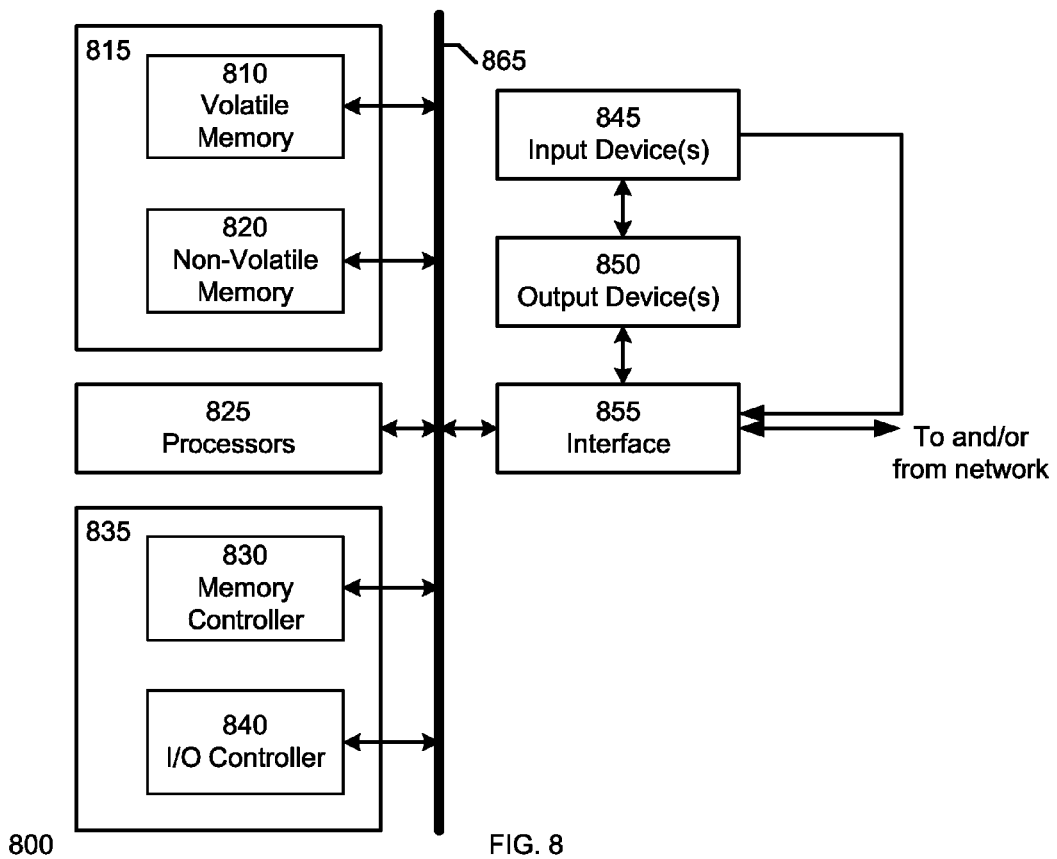
FIG. 8 illustrates a block diagram of a system to implement the methods disclosed herein in accordance with one embodiment of the invention.

FIG. 8 illustrates a block diagram of a system 800 to implement the methods disclosed herein in accordance with one embodiment of the invention. The system 800 includes but is not limited to, a desktop computer, a laptop computer, a notebook computer, a netbook, a personal digital assistant (PDA), a server, a workstation, a cellular telephone, a mobile computing device, an Internet appliance or any other type of computing device. In another embodiment, the system 800 used to implement the methods disclosed herein may be a system on a chip (SOC) system.

The system 800 includes a chipset 835 with a memory controller 830 and an input/output (I/O) controller 840. A chipset typically provides memory and I/O management functions, as well as a plurality of general purpose and/or special purpose registers, timers, etc. that are accessible or used by the processor 825. The processor 825 may be implemented using one or more processors. The processor 825 may also be implemented using multi-core processors. In one embodiment of the invention, the memory controller 830 is integrated into the processor 825.

The memory controller 830 performs functions that enable the processor 825 to access and communicate with a main memory 815 that includes a volatile memory 810 and a non-volatile memory 820 via a bus 865. The volatile memory 810 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 820 includes, but is not limited by, flash memory, ROM, EEPROM, and/or any other desired type of memory device.

Memory 815 stores information and instructions to be executed by the processor 825. Memory 815 may also store temporary variables or other intermediate information while the processor 825 is executing instructions. The system 800 includes, but is not limited to, an interface circuit 855 that is coupled with bus 865. The interface circuit 855 is implemented using any type of well known interface standard including, but is not limited to, an Ethernet interface, a universal serial bus (USB), a third generation input/output (3GIO) interface, and/or any other suitable type of interface.

One or more input devices 845 are connected to the interface circuit 855. The input device(s) 845 permit a user to enter data and commands into the processor 825. For example, the input device(s) 845 is implemented using, but is not limited to, a keyboard, a mouse, a touch-sensitive display, a track pad, a track ball, and/or a voice recognition system.

One or more output devices 850 are connected to the interface circuit 855. For example, the output device(s) 850 are implemented using, but are not limited to, liquid crystal displays (LCDs), cathode ray tube (CRT) displays, printers and/or speakers. The interface circuit 855 includes a graphics driver card.

The interface circuit 855 includes a communication device such as a modem or a network interface card to facilitate exchange of data with external computers via a network. The communication link between the system 800 and the network may be any type of network connection such as an Ethernet connection, a digital subscriber line (DSL), a telephone line, a cellular telephone system, a coaxial cable, etc.

Access to the input device(s) 845, the output device(s) 850, and/or the network is typically controlled by the I/O controller 840 in a conventional manner. In particular, the I/O controller 840 performs functions that enable the processor 825 to communicate with the input device(s) 845, the output device(s) 850, and/or the network via the bus 865 and the interface circuit 855.

While the components shown in FIG. 8 are depicted as separate blocks within the system 800, the functions performed by some of these blocks may be integrated within a single semiconductor circuit or may be implemented using two or more separate integrated circuits. For example, although the memory controller 830 and the I/O controller 840 are depicted as separate blocks within the chipset 835, one of ordinary skill in the relevant art will readily appreciate that the memory controller 830 and the I/O controller 840 may be integrated within a single semiconductor circuit. In one embodiment of the invention, the bus 865 is a communication link shared by all components connected to it. In another embodiment of the invention, the bus 865 is a point-to-point communication link between pairs of components connected each other.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems, and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   determining, by a computing device, a plurality of resources available to perform a received task, the received task having a computational requirement; and
   binary partitioning, by the computing device, the received task recursively into a plurality of subtasks, each subtask having a partitioning ratio and a corresponding portion of the computational requirement based on the partitioning ratio, until the plurality of subtasks is equal to the plurality of resources determined to be available.

2. The method of claim 1, wherein the corresponding portion of the computational requirement of each subtask is substantially equal.

3. The method of claim 1, wherein the received task is the received task of an application and further comprising:
   receiving the task; and
   performing each subtask using a respective one of the plurality of resources determined to be available.

4. The method of claim 3, wherein the application is to be executed using a plurality of processors, and wherein the respective one of the plurality of resources is to be executed using a respective one of the plurality of processors.

5. The method of claim 1, wherein each subtask is independent of an execution result of another subtask of the plurality of subtasks.

6. The method of claim 1, wherein the computational requirement comprises at least one of computational time, processor execution cycles, and iteration cycles of the received task.

7. The method of claim 1, wherein each subtask is associated with an auxiliary partition, the auxiliary partition comprising a parent load factor and a load factor, and wherein the partitioning ratio of each subtask is a ratio of the load factor to the parent load factor.

8. The method of claim 7, wherein the parent load factor associated with each subtask is a load factor associated with a respective parent task of each subtask.

9. The method of claim 8, wherein the load factor associated with each subtask is one of a largest integer not greater than a first result of multiplying the load factor associated with the respective parent task of each subtask with 0.5, and a smallest integer not lesser titan a second result of multiplying the load factor associated with the respective parent task of each subtask with 0.5.

10. A system comprising:
    a plurality of processors;
    an operating system (OS) to be executed on at least one of the plurality of processors; and
    a library operable on the OS to:
        determine a plurality of resources available to perform a received task, the received task having a computational requirement; and
        binary partition the received task recursively into a plurality of subtasks, each subtask having a partitioning ratio and a corresponding portion of the computational requirement based on the partitioning ratio, until the plurality of subtasks is equal to the plurality of resources determined to be available.

11. The system of claim 10, wherein the library to binary partition the received task recursively into a plurality of subtasks is to:
    replicate the received task to create a left and a right subtask of the plurality of subtasks; and
    split a partition associated with the received task into a left and aright partition associated with the left and right subtask respectively, wherein the partition, the left partition and the right partition each comprises a parent load factor and a load factor.

12. The system of claim 11, wherein the partitioning ratio of the left subtask is a ratio of the load factor to the parent load factor of the left partition, and wherein the partitioning ratio of the right subtask is a ratio of the load factor to the parent load factor of the right partition.

13. The system of claim 10, wherein the received task is the received task of a multi-threaded application and wherein the library is further to:
    receive the task; and
    perform each subtask using a respective one of the plurality of resources determined to be available.

14. The system of claim 10, wherein the library is part of the OS.

15. The system of claim 10, wherein the computational requirement of the received task comprises at least one of computational time, processor execution cycles, and iteration cycles of the received task.

16. The system of claim 11, wherein the library is an Intel® Threading Building Blocks (TBB) library.

17. A non-transitory machine readable storage medium having instructions stored thereon which, when executed, cause a plurality of processors to perform the following method:
    determining a plurality of threads available to perform a received task, the received task having a computational requirement; and
    binary partitioning the received task recursively into a plurality of subtasks, each subtask having a partitioning ratio and a corresponding portion of the computational requirement based on the partitioning ratio, until the plurality of subtasks is equal to the plurality of threads determined to be available.

18. The medium of claim 17, wherein the corresponding portion of the computational requirement of each subtask is substantially equal.

19. The medium of claim 17, wherein the received task is the received task of an application and further comprising:
    receiving the task; and
    performing each subtask using a respective one of the plurality of threads determined to be available.

20. The medium of claim 17, wherein each subtask is associated with an auxiliary partition, the auxiliary partition comprising a parent load factor and a load factor, and wherein the partitioning ratio of each subtask is a ratio of the load factor to the parent load factor.

21. The medium of claim 20, wherein the parent load factor associated with each subtask is a load factor associated with a respective parent task of each subtask.

22. The medium of claim 21, wherein the load factor associated with each subtask is one of a largest integer not greater than a first result of multiplying the load factor associated with the respective parent task of each subtask with 0.5, and a smallest integer not lesser than a second result of multiplying the load factor associated with the respective parent task of each subtask with 0.5.

* * * * *